(12) United States Patent
Baumann

(10) Patent No.: US 6,430,825 B1
(45) Date of Patent: Aug. 13, 2002

(54) MAGNETIC COMPASS POINTER WITH BEARING SUPPORT

(75) Inventor: William R. Baumann, New Berlin, WI (US)

(73) Assignee: Johnson Outdoors Inc., Sturtevant, WI (US)

( * ) Notice: Subject to any disclaimer, the term of this patent is extended or adjusted under 35 U.S.C. 154(b) by 0 days.

(21) Appl. No.: 09/556,575

(22) Filed: Apr. 24, 2000

(51) Int. Cl.⁷ ............................................... G01C 17/08
(52) U.S. Cl. .................................................... 33/355 R
(58) Field of Search ........................... 33/355 R, 355 D, 33/356, 357

(56) References Cited

U.S. PATENT DOCUMENTS

| | | | |
|---|---|---|---|
| 2,855,696 A | 10/1958 | Griswold | 33/224 |
| 3,705,334 A | * 12/1972 | Arens et al. | 361/434 |
| 3,853,089 A | * 12/1974 | Howard | 33/355 R |
| 4,357,756 A | * 11/1982 | DeGaeta et al. | 33/355 R |
| 4,438,568 A | * 3/1984 | Kramer et al. | 33/355 R |
| 4,716,655 A | 1/1988 | Sakuma | 33/355 R |
| 4,930,224 A | 6/1990 | LeBlanc | 33/355 D |
| 5,282,318 A | * 2/1994 | Steiner | 33/355 R |
| 5,367,781 A | 11/1994 | Hsu | 33/349 |
| 5,383,280 A | * 1/1995 | McDermott | 33/355 R |
| 6,105,265 A | * 8/2000 | Gloor et al. | 33/355 R |

OTHER PUBLICATIONS

"SG Magnets", SG Magnets Limited, Date unknown, 52 pages.

* cited by examiner

Primary Examiner—G. Bradley Bennett
(74) Attorney, Agent, or Firm—Foley & Lardner

(57) ABSTRACT

The present application discloses a compass having a base, a pivot extending from the base along an axis and a pointer. The pointer includes a central portion resting upon the pivot, a first outer portion radially spaced from the axis of the pivot and having a magnetic north polarity and second outer portion radially spaced from the axis of the pivot and angularly spaced from the first outer portion by approximately 180 degrees. The second outer portion has a magnetic south polarity. The central portion, the first outer portion and the second outer portion are integrally formed as part of a single unitary body including polymeric material. In one exemplary embodiment, the central portion, the first outer portion and the second outer portion are formed from a magnetic powder blended with a polymer matrix. In another exemplary embodiment, the first portion and the second portion include at least one magnetic member encapsulated within a layer solely composed of the polymeric material. In one exemplary embodiment, the compass further includes a bearing partially encapsulated within the central portion such that the bearing rests upon the pivot. The present application also discloses a method for forming the aforementioned compass which includes steps of providing a base, forming a pivot extending from the base along an axis, mixing a magnetic powder with a fluid polymer, molding the mixture of magnetic powder and fluid polymer so as to form a single unitary body having a central portion and first and second opposite portions radially spaced from the central portion, magnetizing the first and second opposite portion so as to have opposite magnetic polarities and resting the central portion upon the pivot. According to one exemplary embodiment, a plurality of compasses having varying sensitivities may be made by varying a ratio of the magnetic powder to the polymeric material.

27 Claims, 1 Drawing Sheet

MAGNETIC COMPASS POINTER WITH BEARING SUPPORT

FIELD OF THE INVENTION

The present invention relates to navigational devices. In particular, the present invention relates to compasses having improved performance which are more easily manufactured.

BACKGROUND OF THE INVENTION

Navigational devices such as compasses are typically used to provide a directional bearing during such activities as camping and hiking. Such compasses typically include either a magnetic thin steel strip pointer or a sintered magnetic pointer. Magnetic thin steel strip pointers typically comprise a stamped thin steel strip which is magnetized and which is mounted to a separate brass or plastic hub. The hub typically receives a press fit jewel bearing which rests upon a pivot upwardly extending from a base. In some applications, the stamped thin steel strip magnet has its opposite ends painted or coated to distinguish between north and south polarities. In other compasses, a disk having direction indicia is secured to the strip, wherein the north indicia is associated with the end of the strip having a south polarity.

Due to the relatively weak sensitivity of such compasses, some compasses alternatively use a sintered magnetic pointer in lieu of the stamped thin steel strip magnetic pointer. To form a sintered magnetic pointer, magnetic metal particles are compressed under extremely high pressures to form a shape which is then heated at extremely high temperatures to molecularly bond the particles together so as to form a solid high volume member which is then magnetized and mounted to a separate hub carrying a press fit jewel bearing. Such sintered pointers have a large thickness and volume due to the manufacturing process requirements. The relatively large volume of such sintered magnets provides a compass with greater magnetic power and sensitivity (i.e., the movement or reaction of pointer in response to movement or rotation of the compass) as compared to the stamped thin steel strip magnetized pointers. However, due to this increased volume, such pointers formed from sintered magnets are large and bulky, increasing the weight and cost of the compass. Moreover, because the magnetic metal particles are only loosely bonded together by the sintering process, sintered magnetic pointers are extremely brittle. In addition, the additional magnetic power offered by such sintered magnetic pointers is to some extent offset by the additional mass and increased inertia of the pointer itself.

Although such conventional compasses are commonly used in a variety of activities, such compasses have several disadvantages. First, compasses having magnetized thin steel strip pointers and compasses having sintered magnetic pointers are expensive in terms of both cost and assembly. With both compasses, the pointer must be assembled to the hub. In addition, the jewel bearing must be press fit into the hub prior to the pointer being rested upon the pivot. Each of the pointer, the hub and the bearing must be manufactured separately, must be separately inventoried and must then be assembled. As a result, such compasses are expensive to manufacture.

Second, the sensitivity or performance of such compasses is frequently inadequate. Although lightweight, the magnetic thin steel strip pointers have limited magnetic power and as a result have limited sensitivity. Though having improved magnetic power and improved sensitivity, sintered magnetic pointers are more expensive to manufacture and are heavy and are bulky, increasing both the size and the weight of the compass.

Third, with such magnetized thin steel strip pointers and such sintered magnetic pointers, it is extremely difficult to provide compasses having a wide range of sensitivities customized for particular applications and consumer budgets. In particular, increasing the magnetic power or sensitivity of such thin steel strip magnetic pointers or such sintered magnetic pointers generally requires increasing the size or mass of the pointer itself. However, increasing the size or mass of the pointer itself also undesirably increases the size and weight of the compass. In addition, each differently sized pointer also generally requires a differently sized compass base or housing as well as differently configured tooling. Purchasing and maintaining such a large inventory of tooling as well as a large inventory of pointers further increases the overall cost of the compass.

Thus, there is a continuing need for a compass and a method for manufacturing such a compass that is lightweight, that can be assembled in less time and that can be provided with a varying sensitivity with a minimal number of changes to the compass itself.

SUMMARY OF THE INVENTION

One embodiment of the invention relates to a compass including a base, a pivot extending from the base along an axis and a pointer. The pointer includes a central portion resting upon the pivot, a first outer portion radially spaced from the axis of the pivot and having a magnetic north polarity and a second outer portion radially spaced from the axis of the pivot and angularly spaced from the first outer portion by 180 degrees. The second outer portion has a magnetic south polarity. The center portion, the first outer portion and the second outer portion are integrally formed as part of a single unitary body including polymeric material.

Another embodiment of the invention relates to a navigational compass device including a base, a pivot extending from the base and a pointer. The pointer includes a bearing support, a bearing coupled to the support and resting upon the pivot, a first wing extending from the bearing support and a second wing extending from the bearing support. The first and second wings have magnetic north and magnetic south polarities, respectively. The bearing support, the first wing and the second wing are integrally formed as part of a single unitary body including a polymeric material.

Another embodiment of the invention relates to a method for making a navigational compass. The method includes providing a base, forming a pivot extending from the base along an axis, mixing a magnetic powder with a fluid polymer, molding the mixture of magnetic powder and fluid polymer so as to form a unitary body having a central portion and first and second opposite portions radially spaced from the central portion, magnetizing the first and second opposite portions so as to have first and second opposite magnetic polarities and resting the central portion upon the pivot. The single unitary body rotates about the axis of the pivot to indicate magnetic north and directions relative thereto.

Another embodiment of the invention relates to a method for making a plurality of navigational compasses having varying sensitivities. The method includes providing a base for each of the plurality of compasses, forming a pivot extending from each base along an axis, mixing a magnetic powder with a fluid polymer for each of the plurality of compasses, varying a ratio of the magnetic powder to the polymeric material for each of the plurality of compasses to provide each of the plurality of compasses with a different sensitivity, molding the mixture of magnetic powder and at least partially fluid polymer so as to form a single unitary body having a central portion and first and second opposite portions radially spaced from the central portion for each of the plurality of compasses, magnetizing the first and second opposite portions so as to have first and second opposite magnetic polarities for each of the plurality of compasses and resting the central portion upon the pivot for each of the plurality of compasses. With the plurality of compasses, the first and second opposite portions rotate about the axis of the pivot to indicate magnetic north and directions relative thereto.

DETAILED DESCRIPTION OF THE PREFERRED EMBODIMENTS

Figure 1:
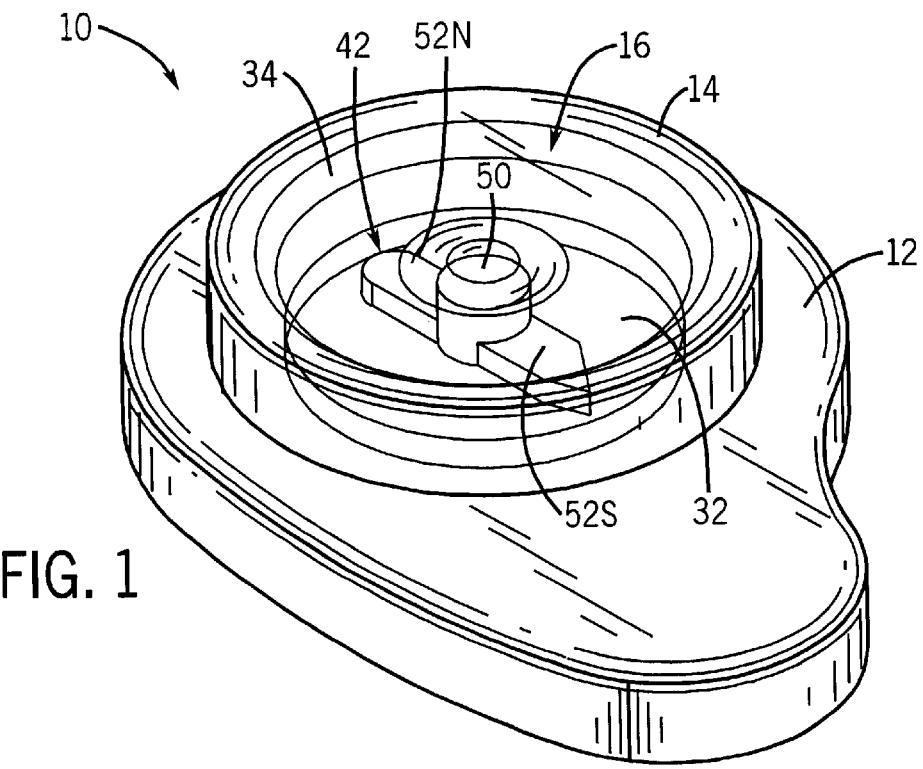
FIG. 1 is a perspective view of an exemplary compass of the present invention.
Figure 2:
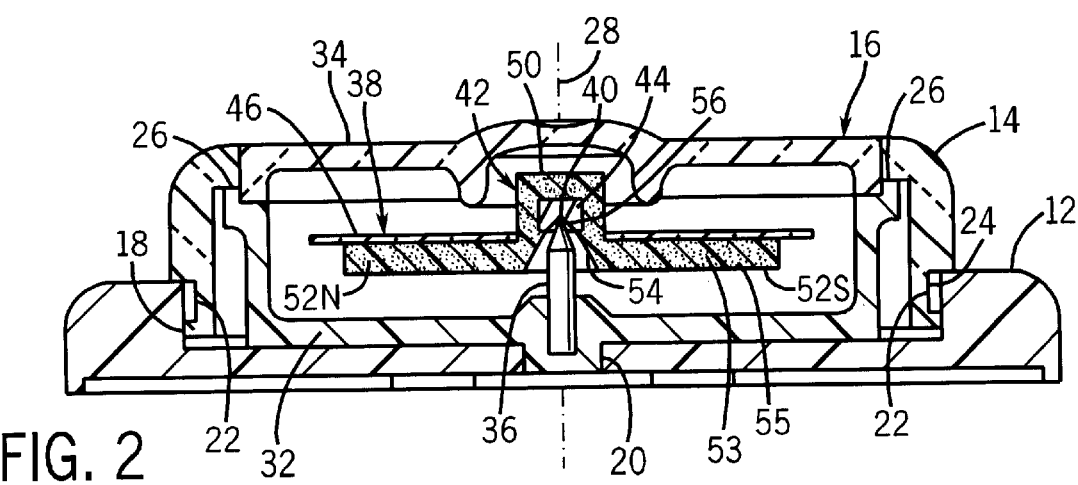
FIG. 2 is a sectional view of the compass of FIG. 1.

FIGS. 1 and 2 illustrate compass 10. FIG. 1 is a perspective view of compass 10. FIG. 2 is a sectional view of compass 10. Compass 10 generally includes base plate 12, bezel ring 14 and pointer subassembly 16. Base plate 12 generally provides a framework for supporting pointed subassembly 16 and is configured for it being held in one's hand. Alternatively, base plate 12 may be configured as part of a console or as part of an overall device providing additional functions. Moreover, base plate 12 may be omitted in particular applications.

In the exemplary embodiment, base plate 12, includes a cavity 18, detent 20 and inwardly extending ribs 22. Cavity 18 and detent 20 are sized and configured to receive subassembly 16. Detent 20 receives a corresponding projecting portion of subassembly 16 to facilitate the alignment of subassembly 16 within cavity 18. Ribs 22 project into cavity 18 and are configured to retain bezel ring 14 within cavity 18 about subassembly 16. As will be appreciated, base plate 12 may have any of a variety of alternative configurations for being secured to subassembly 16 and for retaining bezel ring 14 in place about subassembly 16.

Bezel ring 14 comprises an annular ring configured to be set within cavity 18 about subassembly 16. Bezel ring 14 includes at least one outer circumferential groove 24 which snaps about rib 22 to secure bezel ring 14 to base plate 12. As is shown by FIG. 2, bezel ring 14 further extends over shoulder 26 of subassembly 16 to capture subassembly 16 between bezel ring 14 and base plate 12. In the exemplary embodiment, bezel ring 14 includes degree indications extending 360° about axis 28. In the exemplary embodiment, bezel ring 14 is fixed against rotation about axis 28. Alternatively, bezel ring 14 and base plate 12 may be configured to allow bezel ring 14 to rotate about axis 28. Although less desirable, bezel ring 14 may be omitted in alternative applications where subassembly 16 is directly affixed to base plate 12 or where bezel ring 14 and base plate 12 are omitted entirely.

Pointer subassembly 16 serves as a direction indicating portion of compass 10 and generally includes bottom or base capsule 32, top or cover capsule 34, pivot 36 and pointer 38. Base capsule 32 and cover capsule 34 cooperate to enclose and surround pivot 36 and pointer 38. Base capsule 32 provides a base for supporting pivot 36 and mounts within cavity 18 of base plate 12. In the exemplary embodiment, base plate 32 provides shoulder 26 which enables subassembly 16 to be retained within cavity 18 of base plate 12 by bezel ring 14.

Cover capsule 34 spans across pivot 36 and pointer 38 and is generally made of a transparent material to allow pointer 38 to be viewed. In the exemplary embodiment, base capsule 32 and cover capsule 34 are formed from a clear plastic such as acrylic or acetate. Base capsule 32 and cover capsule 34 are preferably ultrasonically welded to one another. Alternatively, base capsule 32 and cover capsule 34 may be formed from a variety of other materials and may be secured to one another by a variety of other means such as adhesives, structural interlocks, fasteners and the like. In lieu of both base capsule 32 and cover capsule 34 being formed of the same material, capsules 32 and 34 may alternatively be formed from different materials, wherein at least cover capsule 34 is formed from a transparent material.

Pivot 36 projects from base capsule 32 towards cover capsule 34 along axis 28 and provides a point 40 against which pointer 38 rests as it rotates about axis 28. Pivot 36 is preferably formed from a hardened steel or stainless steel and is co-molded with base capsule 32. Alternatively, pivot 36 may be adhesively secured to base capsule 32 or may be press fit into a bore formed in base capsule 32. Although less desirable, pivot 36 may be formed from other materials and may be integrally formed as part of single unitary body with base capsule 32.

Pointer 38 pivots about axis 28 in response to the repositioning of compass 10 so as to provide the user with a constant directional bearing. Pointer 38 generally includes body 42, bearing 44 and card 46 (shown in FIG. 2). (FIG. 1 illustrates compass 10 without card 46.) Body 42 is a single integrally molded component including a central portion, preferably in the form of bearing support 50, and opposite wings 52N, 52S. Bearing support 50 extends along axis 28 and supports wings 52N, 52S for rotation about axis 28. Bearing support 50 further retains bearing 44. As is shown by FIG. 2, bearing support 50 partially encapsulates bearing 44 to secure bearing 44 in place. In particular, as shown by FIG. 2, bearing support 50 integrally extends below portions or lower surfaces of bearing 44 generally facing base capsule 32 to capture bearing 44 while exposing portions of bearing 44 which rest against point 40 of pivot 36. In the exemplary embodiment, bearing support 50 includes a conical or tapered lower opening 54 which communicates with bearing 44 and which receives pivot 36 to allow engagement of point 40 and bearing 44. Although less desirable, bearing support 50 may alternatively provide an internal cavity or bore into which bearing 44 is press fit or in which bearing 44 is adhesively secured.

Wings 52N and 52S are integrally formed as part of a single unitary body with bearing support 50 and provide opposing portions which are angularly spaced from one another by 180 degrees about axis 28. Each of wings 52N and 52S is magnetized so as to have the opposite magnetic polarity. In particular, wing 52N has a south magnetic polarity while wing 52S has a north magnetic polarity. Wing 52N pivots about point 40 and about axis 28 to align itself with magnetic north, thus providing the user with a navigational bearing. In the exemplary embodiment, wings 52N and 52S each have a length extending approximately 0.25 inches to 0.625 inches from axis 28 and 0.1875 inches to 0.5 inches from central portion 50. Each of wings 52N, 52S has a thickness of approximately 0.0625 inches to 0.125 inches and a width of approximately 0.0625 inches to 0.1875 inches. According to one preferred embodiment, wings 52N and 52S each have a length of 0.375 inches from axis 28, a width of about 0.125 inches and a thickness of about 0.0625 inches.

In lieu of body 42 having opposite outwardly extending extensions or wings, body 42 may alternatively include a disk or one or more annular wings integrally formed with bearing support 50 and extending about bearing support 50. In such alternative applications, opposite portions of the disk or the ring angularly spaced approximately 180 degrees relative from one another would be magnetized so as to have opposite magnetic polarities.

Body 42 is formed as a bonded magnet having a magnetic powder 53 mixed with a plastic binder or matrix 55. In the exemplary embodiment, the magnetic powder 53 comprises a ferrite such as barium ferrite ($BaO.6Fe_2O_3$) or strontium ferrite ($SrO.6Fe_2O_3$) or a rare earth such as neodymium iron boron (NdFeB) or alnico. Such magnetic powders have been found to be best suited for use in pointer 38. Each of the noted magnetic powders has a varying degree of power. In particular, rare earth magnetic powders are generally stronger than ferrite magnetic powders. As a result, pointer 38 may be provided with customized sensitivity to fit particular compass applications without varying the overall size or weight of body 42. In the exemplary embodiment, plastic matrix 55 comprises a thermoplastic material such as polyamides including nylon 6 or nylon 6/6. Polyester may also be used. In high temperature applications, polyphenylene sulfide (PPS) may be employed. Theremosets may also be employed. In lieu of utilizing such magnetic powders and such plastics individually, the magnetic powders and the plastic binders may alternatively comprise blends or mixtures thereof to vary the weight as well as the sensitivity of pointer 38.

In the exemplary embodiment, a magnetic powder of barium ferrite ($BaO.6Fe_2O_3$) is mixed with a polymer matrix of nylon 6/6. The ratio of the magnetic powder to the polymer matrix is approximately 4 to 1. As a result, upon being magnetized, wings 52N and 52S of body 42 have a magnetic force of 200 Gauss. Other ratios of the magnetic powder and the polymeric matrix may also be employed. As will be appreciated, the minimum required magnetic strength is largely dependent upon the size of the pointer.

Bearing 44 provides a hardened surface in engagement with point 40 of pivot 36 to allow accurate rotation of pointer 38 about axis 28. Bearing 44 preferably comprises a jewel bearing having a tapered or conical surface 56 for receiving pivot 36. In the exemplary embodiment, bearing 44 comprises a synthetic jewel such as a synthetic sapphire or zirconia. In addition, a PYREX glass may be employed as bearing 44. Although less desirable, bearing 44 may be omitted, wherein bearing support 50 directly rests upon point 40 of pivot 36 to rotatably support pointer 38 for rotation about axis 28.

Card 46 (shown in FIG. 2) comprises a generally annular disk mounted over bearing support 50 and on top of wings 52N, 52S. Card 46 has an upper surface including directional indicia such as "N", "S", "E" and "W" as well as incremental indicia therebetween. The "N" indicia and the "S" indicia are aligned with wings 52N and 52S, respectively. In the exemplary embodiment, card 46 is formed from a lightweight material such as polyester. As will be appreciated, card 46 may be formed from a variety of alternative materials. Moreover, card 46 may alternatively be omitted such as shown in FIG. 1 where compass 10 is non-carded. In such an alternative application, wings 52N and 52S will be provided with different colors, shapes, markings or other indicia identifying wing 52N as north and wing 52S as south.

Pointer 38 is generally formed by first mixing or blending the magnetic powder and the polymer binder or matrix in desired proportions depending upon the desired sensitivity of compass 10. In some applications, the magnetic powder and the polymer binder are mixed while in a solid state and melted to form pellets which are again later melted prior to molding. In other applications, the magnetic powder is mixed into a molten polymer binder. Where large sensitivities are desired, high volume fractions of magnetic powder are possible. Once the magnetic powder has been mixed into the polymer matrix material, the resulting compound is injection molded into a cavity of a mold having the general shape of pointer 38. In applications where bearing 44 is at least partially encapsulated by body 42, bearing 44 is inset within the cavity of the mold such that the compound is molded about bearing 44 to partially encapsule bearing 44. After allowing sufficient time for solidification or cooling, the mold is opened, releasing body 42. Thereafter, body 42 is magnetized to provide opposing portion angularly spaced 180 degrees relative to one another having opposite magnetic polarities. Body 42 is then positioned upon pivot 36 or is provided with card 46 prior to being positioned upon pivot 36 extending from bottom capsule 32. Cover capsule 34 is finally positioned over, and is ultrasonically welded to, bottom capsule 32 to form subassembly 16 which is then mounted to base plate 12 and secured in place by means of bezel ring 14.

Alternatively, body 42 of pointer 38 may be formed by compression molding in lieu of injection molding. As with injection molding, the magnetic powder is mixed with the molten polymer binder or matrix. The resultant compound in a molten state or in a pelletised state is then provided to molding device. In particular, the molding is carried out by axial pressing. Once molded, the component in the shape of body 42 is thermally cured. Although the magnetic properties of body 42 produced by compression molding may be higher than those produced by injection molding, and although tooling costs may be lower with compression molding, shape complexity is sacrificed.

Overall, compass 10 has improved performance, is lighter in weight, is less complex and is easier to manufacture as compared to compasses having magnetized, thin steel strip pointers or sintered magnetic pointers. Because body 42 of pointer 38 comprises a single integrally formed unitary body of a magnetic powder mixed within a polymer matrix, pointer 38 has greater sensitivity since the magnetic powders forming body 42 are stronger as compared to the thin steel strip pointers and are lighter in weight as compared with sintered magnetic pointers. Because body 42 of pointer 38 is formed using injection molding or compression molding, body 42 is much easier and less expensive to manufacture as compared to stamped thin steel strip magnetic pointers or sintered magnetic pointers. Because body 42 includes both bearing support 50 and wings 52N, 52S providing opposite magnetized portions that are angularly spaced 180 degrees from one another and that are formed as part of a single unitary body, pointer 38 as well as compass 10 is quicker and easier to assemble since the previously required hub and its assembly to the wing portions of the pointer is eliminated. Because bearing support 50 also preferably partially encapsulates bearing 44, bearing 44 is more securely retained in place and the number of steps required to assemble pointer 38 is further reduced. Moreover, due to its incorporated polymeric material, body 42 provides compass 10 with a lighter weight and provides body 42 with greater corrosion resistance.

Moreover, body 42 of pointer 38 is formed by a process that enables multiple compasses 10 to be formed which are customized to provide the optimum sensitivity depending upon a particular application. In contrast to conventional compasses having stamped thin steel magnetic pointers or compressed sintered pointers which are varied in power by varying the overall size of the pointer, the sensitivity of compass 10 may be varied without changing the overall size of pointer 38 by simply varying the selected magnetic powder or varying the ratio of the magnetic powder to the polymer matrix. Thus, the method by which compass 10 is formed allows the production of multiple compasses having different sensitivities with the same general tooling.

Figure 3:
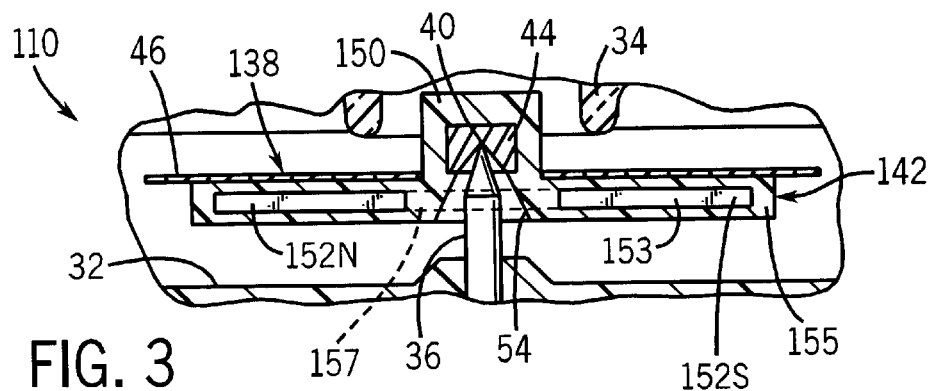
FIG. 3 is an enlarged fragmentary sectional view of an alternative embodiment of the compass of FIG. 1.

FIG. 3 illustrates compass 110, an alternative embodiment of compass 10. For purposes of illustration, FIG. 3 is an enlarged fragmentary sectional view of compass 110. Compass 110 is identical to compass 10 except that compass 110 includes body 142 in lieu of body 42. Those remaining components of compass 110 which correspond to components of compass 10 are numbered similarly. Body 142 is similar to body 42 in shape but includes magnetic member 153 and polymeric overmold 155 in lieu of magnetic powder 53 and polymer matrix 55, respectively. Magnetic member 153 is composed entirely of a magnetic material, such as steel, ferrite or a rare earth that has been magnetized. Magnetic member 153 is preferably composed of a stamped thin steel strip. Magnetic member 153 generally includes an annular central portion 157 which encircles cavity 54 and opposing wings 152N, 152S which are integrally formed as part of a single unitary body with central portion 157. Wing 152N is magnetized so as to preferably have a south magnetic polarity while wing 152S is preferably magnetized so as to have a magnetic north polarity. Magnetic member 153 is co-molded with overmold 155.

Overmold 155 encapsulates magnetic member 153 and is formed entirely out of one or more polymeric materials. Overmold 155 provides layers solely composed of polymeric material extending about magnetic member 153. Although compass 110 is generally less preferred as compared to compass 10, compass 110 is like a relatively inexpensive compass which can be more easily assembled as compared to conventional compasses. Because overmold 155 is integrally formed as a unitary body and simultaneously provides bearing support 150 while encapsulating magnetic member 153, pointer 138 is more easily manufactured since it does not require the assembly of a stamped thin steel needle. At the same time, overmold 155 protects magnetic member 153 from corrosion and is lighter in weight and generally smaller in size as compared to sintered magnets. Because pointer 130 is lighter in weight, pointer 138 is more responsive. Moreover, because overmold 155 partially encapsulates bearing 44 and is overmolded about bearing 44, overmold 155 further reduces manufacturing complexity of compass 110 by eliminating the need for bearing 44 to be press fit or otherwise attached to a separate hub in a separate manufacturing step. Overmold 155 also more securely retains bearing 44 within bearing support 150.

Pointer 138 of compass 110 is generally formed by positioning magnetic member 153 within a cavity of a mold and injecting a polymeric material into the mold about member 153 so as to encapsulate member 153 so as to form bearing support 150 and wings 152N, 152S. In the exemplary embodiment, bearing 44 is also positioned within the cavity of the mold prior to injection of the polymeric material into the mold. Once the molten polymeric material has been allowed to solidify and cool, the mold is separated to remove body 142. Magnetic member 153 is then magnetized to provide wings 152N and 152S with opposite polarities. Alternatively, wings 152N and wings 152S may be magnetized prior to insertion into the cavity of the mold. In lieu of having an annular central portion 157 and opposite outwardly extending wings 152N and 152S, member 153 may alternatively be composed of a disk or ring of solid magnetic material encapsulated within overmold 155, wherein opposite portions of the ring or disk are angularly spaced 180 degrees apart from one another are magnetized so as to have opposite magnetic polarities.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A compass comprising:
   a base;
   a pivot extending from the base along an axis; and
   a pointer including:
   a central portion resting upon the pivot;
   a first outer portion radially spaced from the axis of the pivot and having a magnetic north polarity; and
   a second outer portion radially spaced from the axis of the pivot and angularly spaced from the first outer portion by approximately 180 degrees, the second outer portion having a magnetic south polarity, wherein the central portion, the first outer portion and the second outer portion are integrally formed as part of a single unitary body including polymeric material.

2. The compass of claim 1, wherein the central portion, the first outer portion and the second outer portion are formed from a magnetic powder blended with a polymer matrix and wherein the first and second outer portions are magnetized to have a magnetic north and a magnetic south polarities, respectively.

3. The compass of claim 2, wherein the magnetic powder comprises a ferrite.

4. The compass of claim 3, wherein the magnetic powder is selected from the group including: barium ferrite or strontium ferrite.

5. The compass of claim 2, wherein the magnetic powder comprises a rare earth.

6. The compass of claim 5, wherein the magnetic powder is selected from a group including neodymium iron boron or alnico.

7. The compass of claim 1, wherein the polymeric material is selected from the group including polyamides, polyphenylene sulfide or polyester.

8. The compass of claim 1, wherein the first portion and the second portion include at least one magnetic member encapsulated within a layer solely composed of the polymeric material and wherein the at least one member is magnetized to have magnetic north and magnetic south polarities.

9. The compass of claim 1, wherein the central portion comprises a bearing support having a cavity and wherein the compass includes a bearing received within the cavity, the bearing resting upon the pivot.

10. The compass of claim 9, wherein the bearing comprises a jewel bearing.

11. The compass of claim 9, wherein the bearing includes a surface facing the base, wherein the central portion extends adjacent to the surface so as to at least partially encapsulate the bearing within the cavity.

12. The compass of claim 1 including a bezel ring moveably coupled to the base.

13. The compass of claim 1 including a circular disk mounted to the pointer, the disk having an upper surface with direction indicia.

14. The compass of claim 1, wherein the first portion and the second portion are provided by first and second wings, respectively, extending from opposite sides of the central portion.

15. A navigational compass device comprising:
   a base;
   a pivot extending from the base; and
   a pointer including:
      a bearing support;
      a bearing coupled to the support and resting upon the pivot;
      a first wing extending from the bearing support; and
      a second wing extending from the bearing support, the first and second wings having magnetic north and magnetic south polarities, respectively, wherein the bearing support, the first wing and the second wing are integrally formed as part of a single unitary body including a polymeric material.

16. The compass of claim 15, wherein the bearing support, the first wing and the second wing are formed from a magnetic powder blended with a polymer matrix and wherein the first and second wings are magnetized to have a magnetic north and a magnetic south polarities, respectively.

17. The compass of claim 15, wherein the first wing and the second wing include magnetic members encapsulated within a layer solely composed of the polymeric material and wherein the first and second magnetic members are magnetized to have magnetic north and magnetic south polarities, respectively.

18. The compass of claim 15, wherein the bearing has a surface facing the base and wherein the polymeric material extends adjacent the surface to at least partially encapsulate the bearing within the bearing support.

19. A method for making a navigational compass, the method comprising:
   providing a base;
   forming a pivot extending from the base, the pivot extending along an axis;
   mixing a magnetic powder with a polymer;
   molding the mixture of magnetic powder and polymer so as to form a single unitary body having a central portion and first and second opposite portions radially spaced from the central portion;
   magnetizing the first and second opposite portions so as to have first and second opposite magnetic polarities; and
   resting the central portion upon the pivot, wherein the single unitary body rotates about the axis of the pivot to indicate magnetic north and directions relative thereto.

20. The method of claim 19 including the step of securing a bearing to the central portion, wherein the bearing is rested upon the pivot.

21. The method of claim 19, wherein the step of molding includes molding the mixture of magnetic powder and polymeric material partially about a bearing proximate the central portion while leaving a portion of the bearing exposed such that the bearing portion contacts the pivot when the single unitary body is rested upon the pivot.

22. The method of claim 19 including mounting a card to the single unitary body, the card including direction indicia.

23. A method for making a plurality of navigational compasses having varying sensitivities, the method comprising:
   providing a base for each of the plurality of compasses;
   forming a pivot extending from the base, the pivot extending along an axis;
   mixing a magnetic powder with a polymer for each of the plurality of compasses;
   varying a ratio of the magnetic powder to the polymeric material for each of the plurality of compasses to provide each of the plurality of compasses with a different sensitivity;
   molding the mixture of magnetic powder and polymer so as to form a single unitary body having a central portion and first and second opposite portions radially spaced from the central portion for each of the plurality of compasses;
   magnetizing the first and second opposite portions so as to have first and second opposite magnetic polarities for each of the plurality of compasses; and
   resting the central portion upon the pivot for each of the plurality of compasses, wherein the first and second opposite portions rotate about the axis of the pivot to indicate magnetic north and directions relative thereto.

24. The compass of claim 1, wherein the central portion includes a conical shaped cavity receiving the pivot.

25. The compass of claim 1 including a cover spanning across the pivot and the pointer, wherein the cover is transparent to enable the pointer to be viewed.

26. The compass of claim 1 including degree indicating indicia coupled to the base and extending about the axis.

27. The compass of claim 15, wherein the first wing and the second wing linearly extend away from the bearing support opposite one another along a common axis.

* * * * *